United States Patent
Klein et al.

(10) Patent No.: US 6,410,866 B1
(45) Date of Patent: Jun. 25, 2002

(54) OPERATING DEVICE

(75) Inventors: Thomas Klein, Heidenheim; Thomas Keller, Frankfurt, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/354,197

(22) Filed: Jul. 15, 1999

(30) Foreign Application Priority Data

Jul. 21, 1998 (DE) ............................... 198 32 677

(51) Int. Cl.$^7$ ............................................. H01H 9/00
(52) U.S. Cl. ................. 200/5 R; 200/5 B; 200/17 R; 200/5.8; 200/336
(58) Field of Search ................. 200/4, 5 R, 5 C, 200/5, 8, 17 R, 18, 1 B, 50.32, 61.54, 520, 526, 564, 329, 330, 336, 341

(56) References Cited

U.S. PATENT DOCUMENTS

| | | | | |
|---|---|---|---|---|
| 5,925,860 A | * | 7/1999 | Lee | 200/18 |
| 5,939,684 A | * | 8/1999 | Sin | 200/18 |
| 5,945,646 A | * | 8/1999 | Miller et al. | 200/5 R |
| 6,034,337 A | * | 3/2000 | Siegert | 200/50.32 |
| 6,080,942 A | * | 6/2000 | Sasaki | 200/17 R |

FOREIGN PATENT DOCUMENTS

| | | | |
|---|---|---|---|
| DE | 3737087 | 5/1989 | B60R/16/02 |
| DE | 19507952 | 9/1995 | G05G/1/02 |
| DE | 29604717 | 7/1996 | B60R/16/02 |
| DE | 19608869 | 9/1997 | G10L/7/08 |
| DE | 19609390 | 9/1997 | B60K/37/06 |
| DE | 19645211 | 5/1998 | G05G/1/00 |
| EP | 0427036 | 5/1991 | G06F/3/023 |
| EP | 0585730 | 3/1994 | G06F/3/023 |
| EP | 0702366 | 3/1996 | G11B/19/02 |
| EP | 0794502 | 9/1997 | G06K/11/18 |
| WO | 9211623 | 7/1992 | G09G/3/02 |
| WO | 9532776 | 12/1995 | A63F/9/22 |

OTHER PUBLICATIONS

"Honorable Mentions" Byte, US McGraw–Hill Inc. St Peter–Borough, Oct. 1, 1995, p. 161, XP 002033899.

* cited by examiner

*Primary Examiner*—Michael Friedhofer
(74) *Attorney, Agent, or Firm*—Martin A. Farber

(57) ABSTRACT

In an operating devise with which functional groups, functions and/or function values can be dialed by the handle of a rotary switch being rotated, and selected by one or more input switches, at least one input switch (2) is arranged on or beside the outer periphery of the handle of the rotary switch or within the handle (1) of the rotary switch.

7 Claims, 2 Drawing Sheets

OPERATING DEVICE

FIELD AND BACKGROUND OF THE INVENTION

The Invention relates to an operating device, in particular for motor vehicles, with which functional groups, functions and function values can be dialed by means of the handle of a rotary switch and selected by one or more input switches. The prior art discloses the use of a rotary switch for dialing functional groups, functions and function values, and the selection of the dialed functional group, function or the dialed function value by means of an input knob which is physically remote. The disadvantage in this case is that either a second hand is needed for the setting, it being necessary for the rotary switch to be released by the hand and for the input push-button to be felt by the hand, or to be carried out by an operation controlled by the eyes. In this case, a certain amount of attention by the user is necessary, so that, in particular in the case of operating devices in motor vehicles or aircraft, the attention is diverted to an excessive extent. Therefore, the prior art also discloses operating devices in which a functional group, function and/or a function value can be dialed by means of a rotary switch, and the dialed functional group, function or the dialed function value can be selected as a result of axial operation of the rotary switch.

The disadvantage with this known operating device is that, in particular in motor vehicles, a functional group, function or function value just dialed during operation is inadvertently selected by the input function being carried out as a result of inadvertent axial pressure during the rotation of the rotary switch. This inadvertent pressure can be caused, in particular, while traveling over uneven roads or by other forces which act on the hand of the operator of the rotary switch during the acceleration or braking of the motor vehicle.

SUMMARY OF THE INVENTION

The object of the invention is therefore to specify an operating device for dialing and selecting functional groups, functions and function values in which selection of the functional groups, functions and function values can be carried out without searching for the input device, and in which unintentional selection of functional groups, functions and function values is avoided.

This object is achieved by at least one input switch being arranged on or beside the outer periphery of the handle of the rotary switch or within the handle of the rotary switch. This input switch may be implemented, for example, by a push-button or by a capacitive, inductive or optical input device.

As a result of the arrangement of the input switch or switches, the input switch can be operated by hand by one or more fingers or regions of the hand which is used to rotate the handle of the rotary switch, it being possible for the fingers which operate the handle of the rotary switch to remain to the greatest possible extent on the handle of the rotary switch. Unintentional input of a value just dialed can be ruled out in this way. Furthermore, it is not necessary for the hand operating the handle to engage around the handle, so that, by comparison with the known operating devices with separate selection and output switches, the operating device is simpler and more reliable to operate.

If the input switch at least partially frames the handle, a simple construction of the operating device is provided, and the handle of the rotary switch can be rotated by the thumb and index finger of one hand, for example, and the input switch can be operated by the middle finger.

If the input switch completely frames the handle of the rotary switch, the operating device can be operated from any position and by any hand. If the operating device is arranged, for example, on a central console or in the center of the dashboard of a motor vehicle, it is then possible both for the driver and for the passenger to operate the operating device by using only one hand in each case.

If the input switch is configured as a touch pad, which, for example, either operates a normal push-button or triggers an input function by means of inductive, capacitive or optical effects, the geometry of the touch pad can be matched to the design of the device and operation can be simplified further. In particular, shaping the touch pad in such a way that it can be operated by the heel of the hand which is operating the handle of the rotary switch makes particularly simple and reliable handling of the operating device possible, even during a journey in a motor vehicle. In the case of a touch pad having one or more push-buttons for triggering the input function, it is particularly agreeable, for example for the operator, if one or two trough-like recesses for the respective heel of the hand are provided in the touch pad.

If at least one push-button is arranged on the outer periphery of the handle of the rotary switch, and can be operated by radial pressure, the input function can be triggered simultaneously by the finger of the hand which is operating the handle, without additional extremities of the user being needed.

The fact that the force required to operate the push-button is adjustable means that the operating device can be adapted to different operators and their operating habits.

The fact that the input switch is arranged within the handle of the rotary switch means that a particularly compact configuration can be implemented with a desired size of the handle.

The output of haptic feedback from the handle of the rotary switch to the user makes operation more convenient and more reliable.

If this haptic feedback is variable as a function of the functional groups, functions and function values to be set, operation of the operating device is simplified further, since, as a result of this feedback, the operator senses the operating menu in which he is currently located, without having to pay attention to other optical or acoustic feedback.

BRIEF DESCRIPTION OF THE DRAWINGS

The invention will be explained in more detail below using the figures, in which.

DETAILED DESCRIPTION OF THE PREFERRED EMBODIMENT

Figure 1:
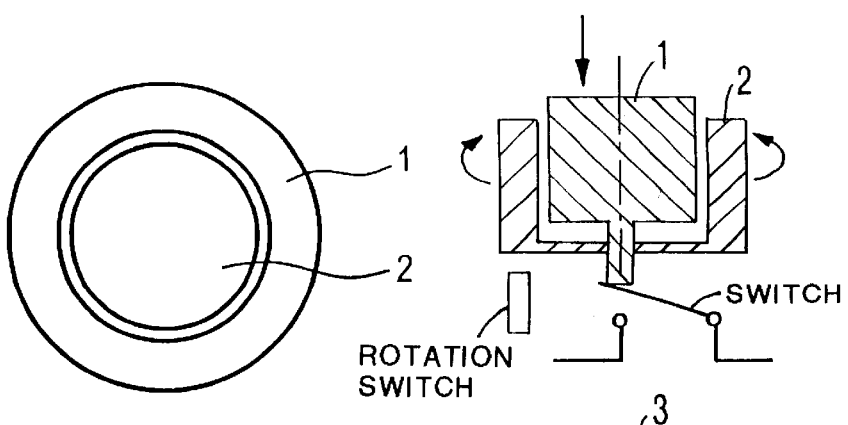
FIG. 1: shows a first configuration of the invention, in which the input switch is arranged within the handle of the rotary switch.

In FIG. 1, an input switch 2 is arranged within the handle 1 of the rotary switch. This input switch 2 can be implemented, as illustrated, by the handle 2 of the input switch, which may be configured as a push-button. It is also possible to implement an input switch by means of inductive, capacitive and/or optical means which are arranged within the handle 1 of the rotary switch.

Figure 2:
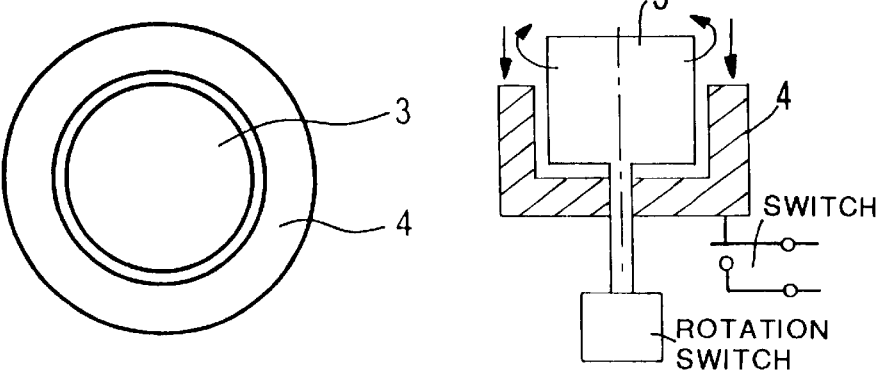
FIG. 2: shows a second configuration of the invention, in which the input switch completely frames the handle of the rotary switch.

In FIG. 2, the handle 3 of the rotary switch is completely framed by an input switch 4, it being possible for this switch, and for the input switch 2 in FIG. 1, to be implemented purely mechanically by one or more push-buttons or electronically by inductive, capacitive and/or optical means.

Figure 3:
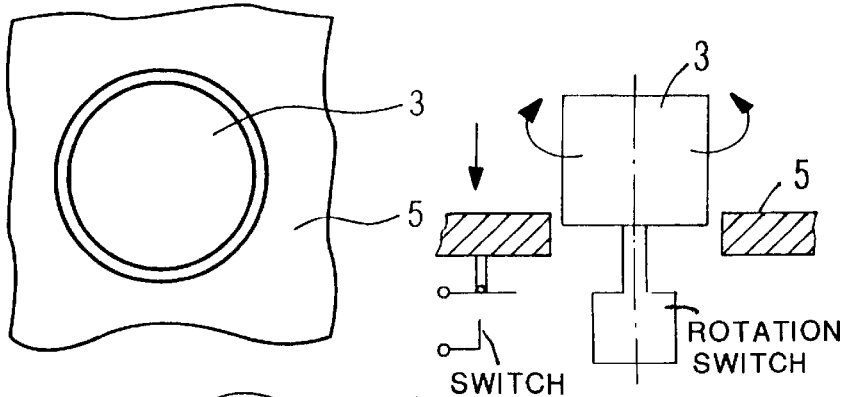
FIG. 3: shows a third configuration of the invention, in which the input switch is configured as a touch pad which completely frames the handle of the rotary switch.

The input switch in FIG. 3 is implemented as a touch pad 5, which completely frames the handle 3 of the rotary, switch. The touch pad 5 may be implemented, for example, mechanically as a switch mat or like the input switches 2, 4 previously described.

Figure 4:
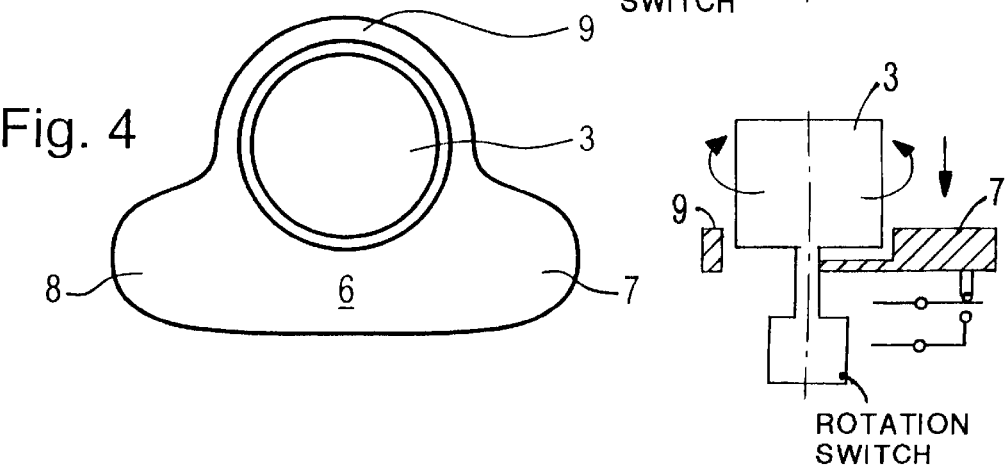
FIG. 4: shows a fourth configuration of the invention, in which the touch pad has a rest for the left and right heel of the hand which is operating the handle of the rotary switch

In FIG. 4, the input switch 6 has two areas 7, 8 which can be operated by the heel of the hand which is operating the handle 3 of the rotary switch. Thus, for example, the handle 3 of the rotary switch can be operated by the thumb and the index finger of the right hand, and the input function can be triggered by lowering the heel of the hand onto the area 7. In the example illustrated in FIG. 4, it is also possible, when setting the handle 3 of the rotary switch with the thumb, and for example, the index finger of one hand, to carry out the input function by actuating the touch pad 6 using a further finger in the radial area 9 of the touch pad. If the touch pad 9 carries out the switching functions using mechanical means, the input function is particularly easy and agreeable for the operator to carry out if the areas 7, 8 are of trough-like configuration to accommodate the respective heel of the hand. Thus, for example, it is particularly agreeable for the operator if the area 7 is configured to accommodate the heel of the right hand, and the area 8 is configured to accommodate the heel of the left hand.

Figure 5:
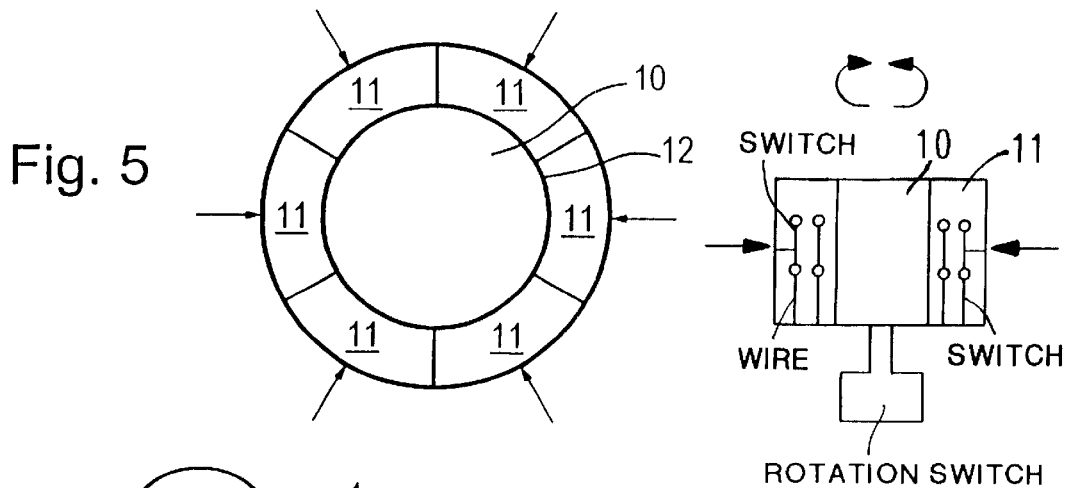
FIG. 5: shows a hand of a rotary switch in which a number of input switches are arranged on the outer periphery of the handle.

FIG. 5 shows a handle 10 of a rotary switch in which a number of input switches in the form of push-buttons 11 are arranged on the outer periphery 12 of the handle 10 and can be operated by radial pressure, as indicated by the arrows. By this means, the input function can be triggered by the fingers which are rotating the handle 10, without the fingers having to change their position, with the exception of the operating travel for the push-button 11. It is advantageous if only the operation of one push-button 11 is required in order to carry out the input function. It is then sufficient for the operator to increase the pressure on the handle using only one finger. If the force required to operate the push-button or push-buttons 11 can be varied, the operating device can be matched to individual habits of the operator.

Figure 6:
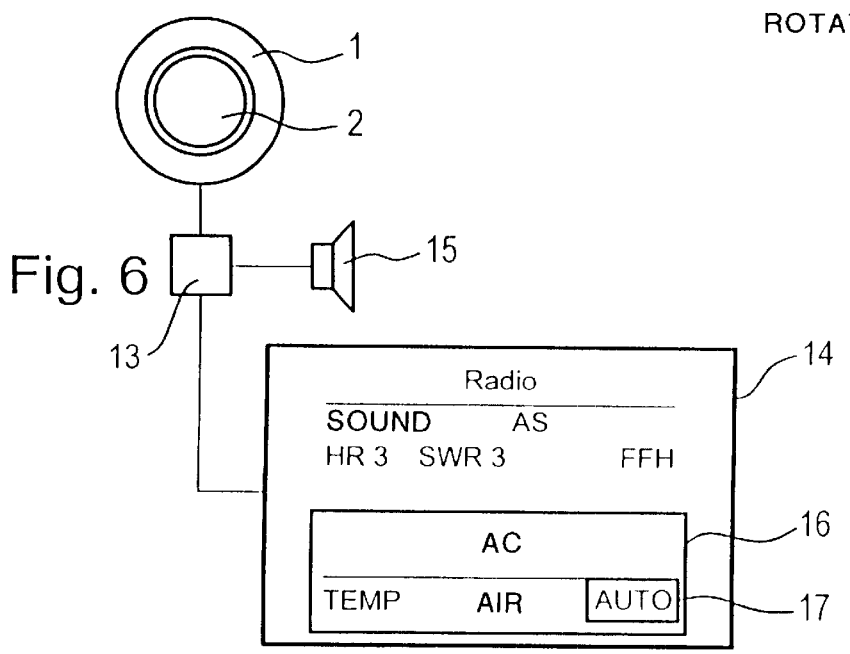
FIG. 6: shows an operating device and, in addition, a display and a loudspeaker.

FIG. 6 shows, in addition to the handle 1 and the input switch 2, the rotary switch 13, including the evaluation and driving electronics, a display 14 and a loudspeaker 15. The display 14 shows two functional groups, namely the radio functional group and the air-conditioning (AC) functional group. In the radio functional group, the individual functions of the car radio can be dialed and selected and can then be set. In the air-conditioning functional group, individual functions of the motor-vehicle air-conditioning system can be selected and then set. In FIG. 6, the air-conditioning functional group is dialed, which is shown by the frame 16 represented on the display 14. Instead of using a frame, the functional group or function dialed or the function value dialed can also be represented, for example, by means of a color change of the functional group or functions dialed or by an appropriate negative mode.

As a result of the handle 1 of the rotary switch 13 being rotated, a frame 17 jumps to and fro between the functions which can be dialed, temperature, air and auto in FIG. 6, depending on the direction of rotation of the handle. The function dialed, the auto function in FIG. 6, can be selected by the input switch 2 being operated.

The functional groups, functions and function values dialed and selected can also be represented acoustically via the loudspeaker 15.

Figure 7:
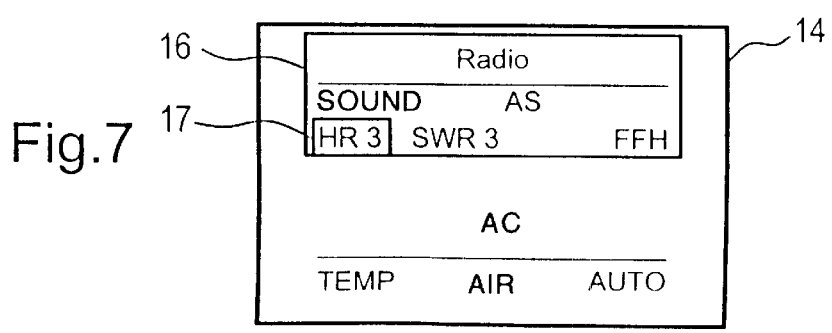
FIG. 7: shows the display from FIG. 6 with a different functional group dialed.

In FIG. 7, the radio menu has been selected on the display 14, which is again also represented optically by the frame 16. Within the radio menu, the HR3 transmitter has been dialed, which is represented by the frame 17. This transmitter can be selected by the input switch being operated.

What is claimed is:

1. An operating device, with which functional groups, functions or function values can be dialed by a handle of a rotary switch being rotated, and selected by at least one input switch, the handle of the rotary switch comprising an outer periphery, wherein the at least one input switch is arranged on the outer periphery of the handle of the rotary switch and wherein the at least one input switch completely frames the handle of the rotary switch.

2. The operating device as claimed in claim 1, wherein the at least one input switch is operatable by radial pressure.

3. The operating device as claimed in claim 1, wherein the functional groups, functions or values to be set are optically transmittable to an operator by a display or acoustically by a loud-speaker.

4. The operating device, with which functional groups, functions or function values can be dialed by a handle of a rotary switch being rotated, and selected by at least one input switch, the handle of the rotary switch comprising an outer periphery, wherein the at least one input switch is arranged beside the outer periphery of the handle of the rotary switch, and wherein the at least one input switch at least partially frames the handle of the rotary switch, and wherein the at least one input switch completely frames the handle of the rotary switch.

5. The operating device, with which functional groups, functions or function values can be dialed by a handle of a rotary switch being rotated, and selected by at least one input switch, the handle of the rotary switch comprising an outer periphery, wherein the at least one input switch is arranged beside the outer periphery of the handle of the rotary switch, and wherein the at least one input switch at least partially frames the handle of the rotary switch, wherein the at least one input switch is a touch pad, and wherein the touch pad is shaped such that the at least one input switch is operatable by a heel of a left or right hand while some fingers of a corresponding hand hold the handle of the rotary switch.

6. An operating device, with which functional groups, functions or function values can be dialed by a handle of a rotary switch being rotated, and selected by at least one input switch, the handle of the rotary switch comprising an outer periphery, wherein the at least one input switch is arranged on the outer periphery of the handle of the rotary switch, and wherein said at least one input switch is a touch pad, and wherein the touch pad is shaped such that the at least one input switch is operatable by a heel of a left or right hand while some fingers of a corresponding hand hold the handle of the rotary switch.

7. An operating device, with which functional groups, functions or function values can be dialed by a handle of a rotary switch being rotated, and selected by at least one input switch, the handle of the rotary switch comprising an outer periphery, wherein the at least one input switch is arranged beside the outer periphery of the handle of the rotary switch, and wherein said at least one input switch is a touch pad, and wherein the touch pad is shaped such that the at least one input switch is operatable by a heel of a left or right hand while some fingers of a corresponding hand hold the handle of the rotary switch.

* * * * *